March 25, 1924.
G. F. WERTH
MOTOR STAND
Filed March 25, 1921
1,488,304
5 Sheets-Sheet 1
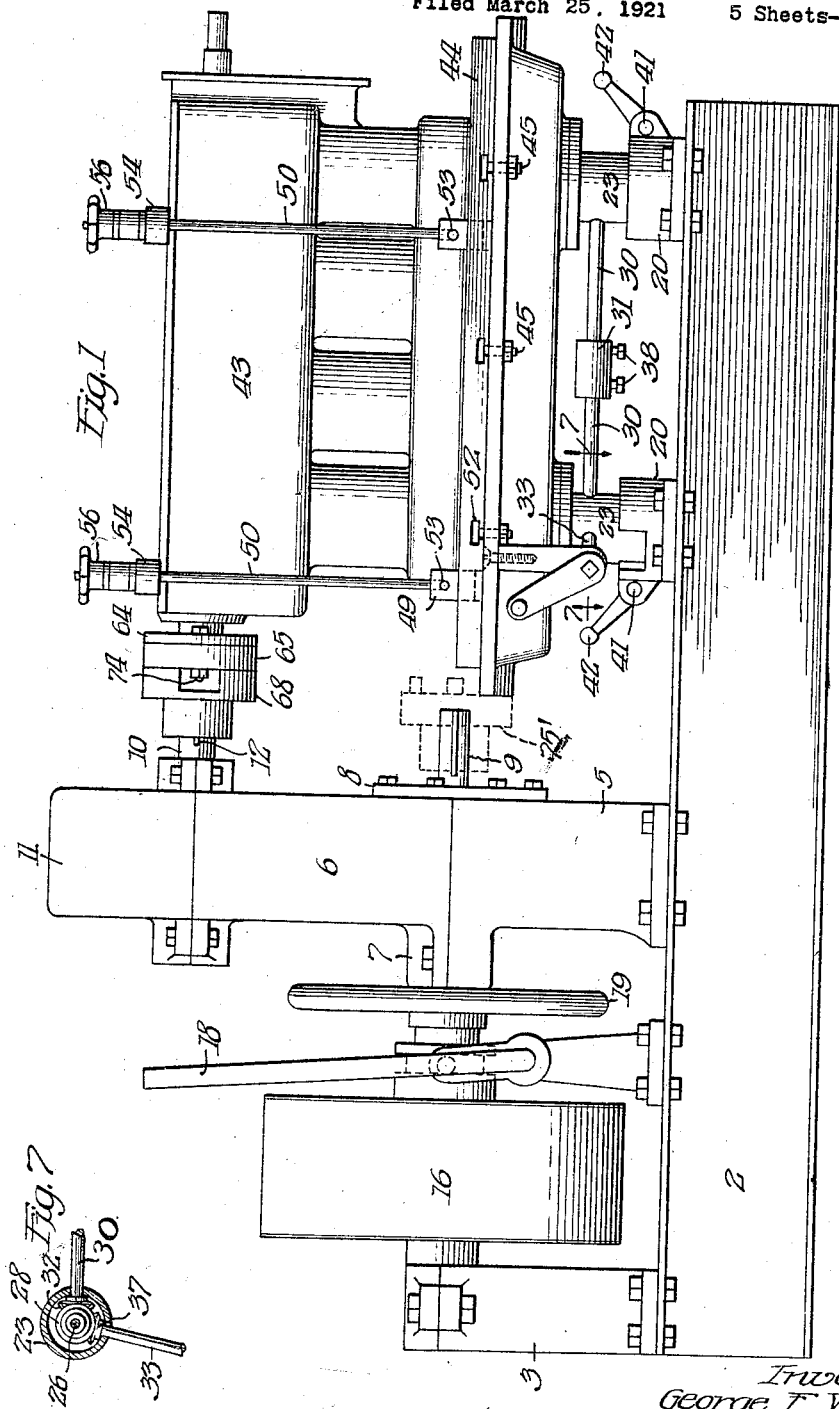
Inventor:
George F. Werth,
By Fisher, Fowle, Clapp & Soans
attys.

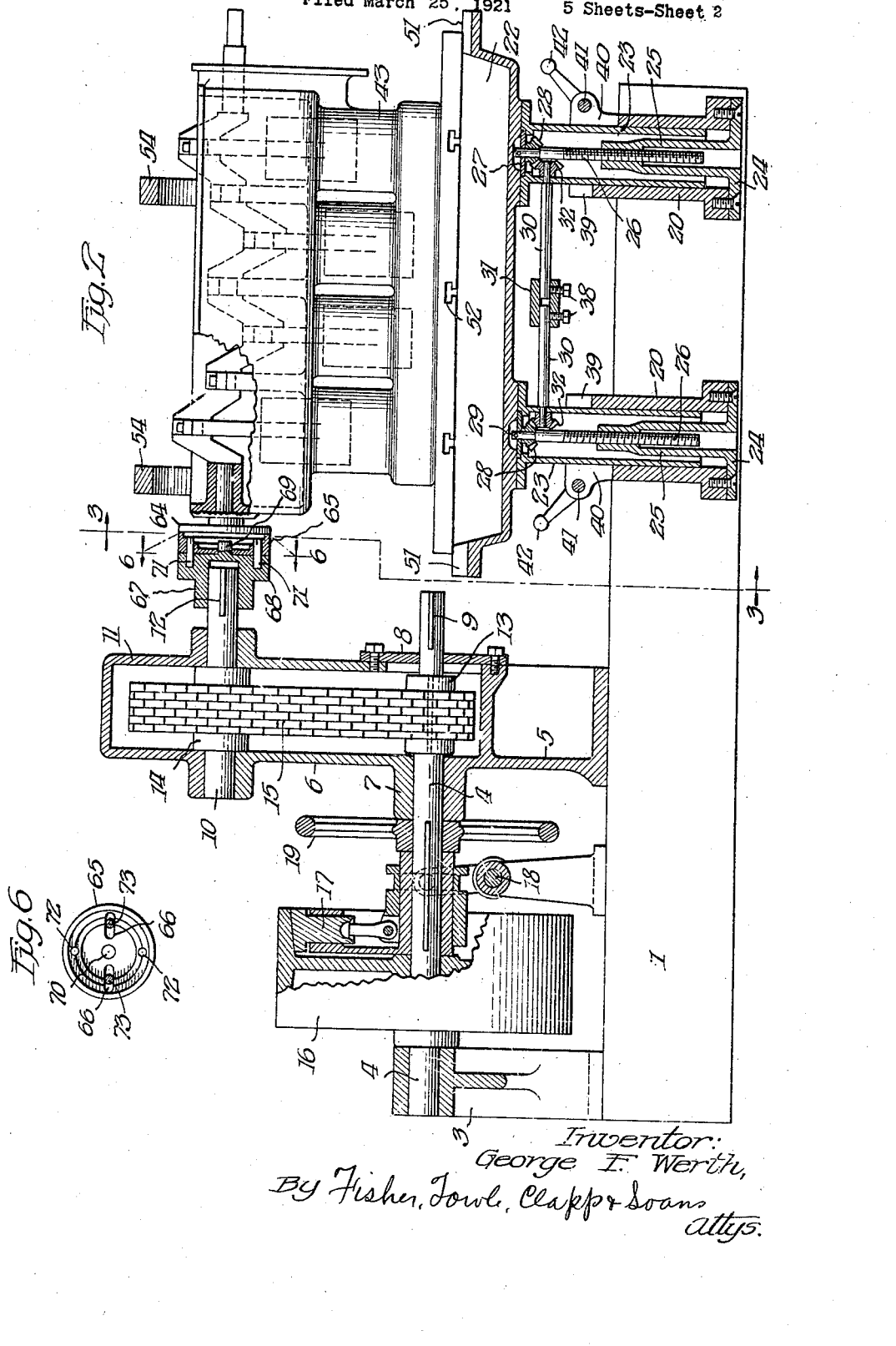

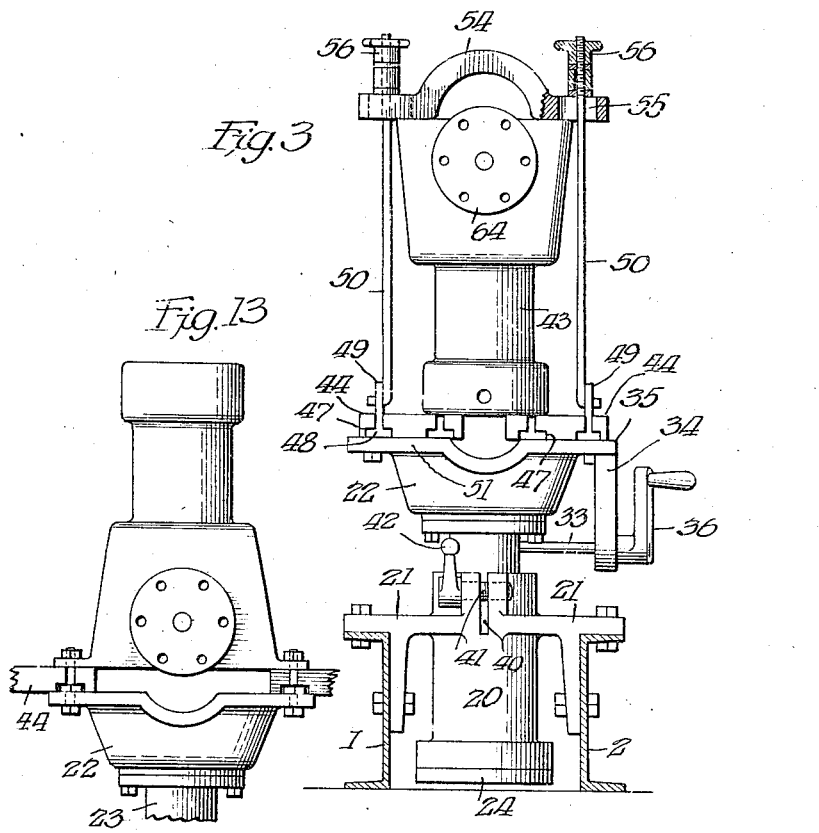
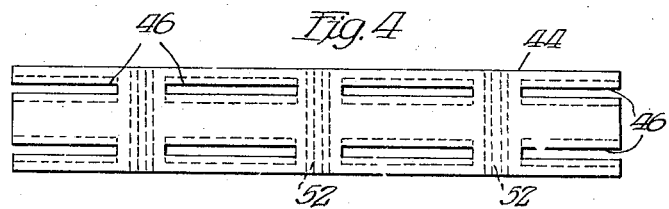
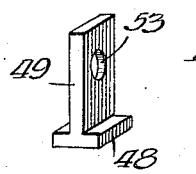

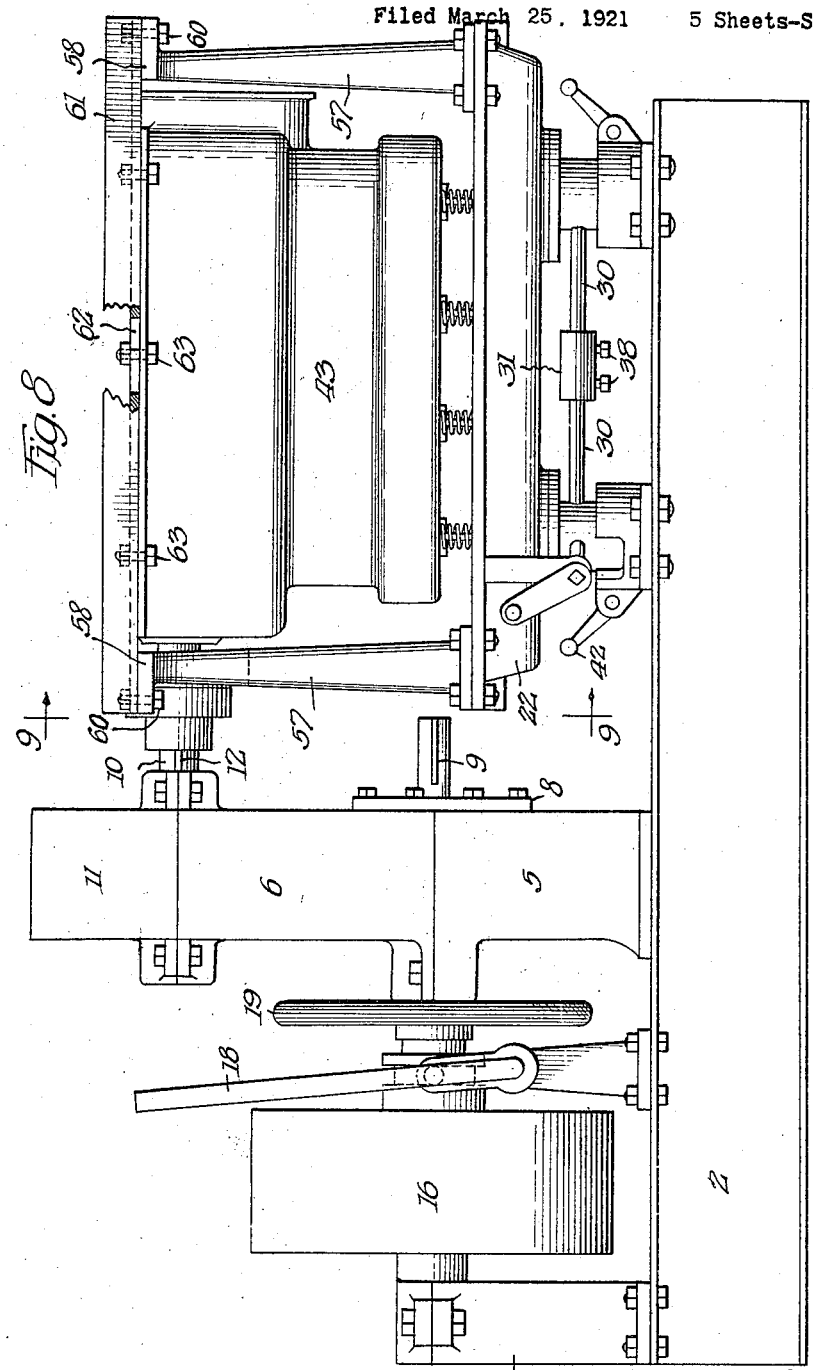

March 25, 1924.
G. F. WERTH
1,488,304
MOTOR STAND
Filed March 25, 1921   5 Sheets-Sheet 5
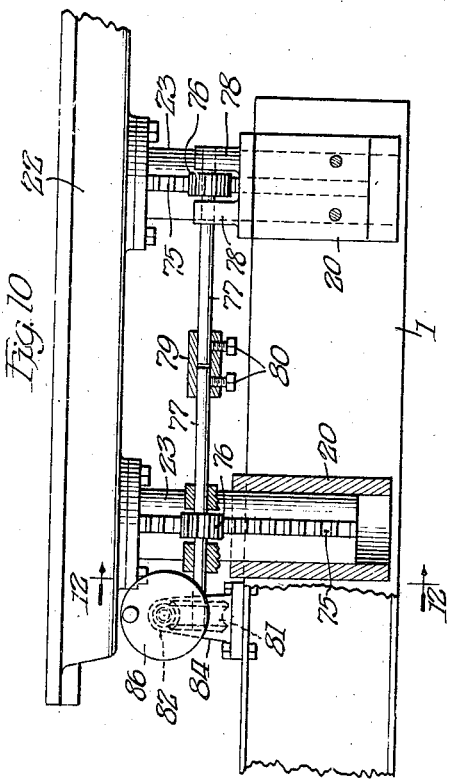
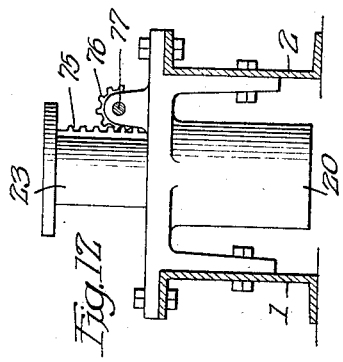
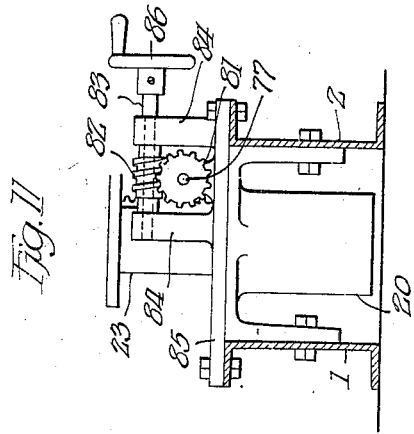
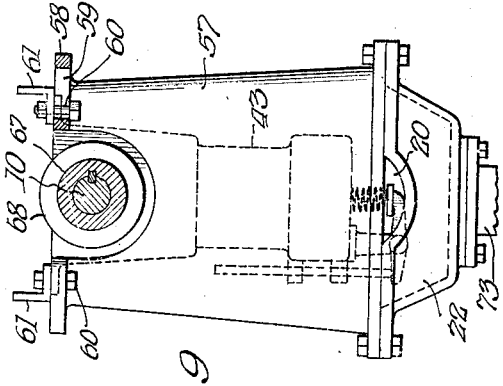
Inventor:
George F. Werth,
By Fisher, Fowle, Clapp & Soans
Attys.

Patented Mar. 25, 1924.

1,488,304

UNITED STATES PATENT OFFICE.

GEORGE F. WERTH, OF CHICAGO HEIGHTS, ILLINOIS, ASSIGNOR TO CANEDY-OTTO MFG. CO., OF CHICAGO HEIGHTS, ILLINOIS, A CORPORATION OF ILLINOIS.

MOTOR STAND.

Application filed March 25, 1921. Serial No. 455,386.

*To all whom it may concern:*

Be it known that I, GEORGE F. WERTH, a citizen of the United States, residing at Chicago Heights, in the county of Cook and State of Illinois, have invented certain new and useful Improvements in Motor Stands, of which the following is a specification.

My invention has reference more particularly to a frame for supporting a motor so that the crank shaft bearings are accessible for repairs and adjustments and may be worked in by operating the crank shaft by power.

In motor construction it has become the practice to fit the crank shaft in the bearings by operating the shaft by power in the unfinished bearings, without lubrication, so as to "burn in" the bearings, after which the bearings are oiled and the crank shaft operated, preferably at a high rate of speed, to burnish and finish up the bearings.

It is desirable to follow the same practice in garages and repair shops in overhauling and repairing motors, but as there are many different makes of motors and they vary greatly in size and form, it is not practicable to do so unless a satisfactory motor stand is provided for the purpose, which will not only accommodate the various makes of motors, but is easily and quickly adaptable to the different makes.

The principal objects of my invention are to provide a universal stand for supporting the various makes of motors, and for operating the crank shafts thereof to burn in and finish up the bearings; to enable the stand to be easily and quickly adapted to motors of different size and form; to utilize the same parts for supporting and attaching different makes of motors; to facilitate adjustment for aligning the motor crank shaft with a drive shaft; to provide improved mechanism for raising and lowering the motor on the stand for effecting such alignment; to provide an improved connection of the drive shaft with the crank shaft and motor; to permit reversal of the motor on the stand and operation of the crank shaft at a different rate of speed in each position; to inclose the crank shaft and bearings and prevent the escape of oil during the operation of burnishing the bearings; to provide suspension means for certain types of motors; and in general, to provide a simple and inexpensive stand of this character which is suitable for use in garages and automobile repair shops where motors of various makes are to be repaired or overhauled.

On the drawings—

Fig. 1 is a side view of the motor stand with a motor mounted thereon in inverted position and connected with the driving mechanism for burning in the bearings.

Fig. 2, a similar view with parts broken away and in section to disclose details of construction.

Fig. 3, a vertical section view on the line 3—3 of Fig. 2.

Fig. 4, a top view of one of the slotted rails which are used in connection with the oil pan for supporting the motor.

Fig. 5, a perspective view of the adjustable connector which I employ for attaching clamping rods to the side rails.

Fig. 6, a view on the line 6—6 of Fig. 2, showing a part of the clutch for connecting the motor shaft with a driving shaft of the stand.

Fig. 7, a fragmentary sectional view on the line 7—7 of Fig. 1 showing the gearing for adjusting the elevation of the stand.

Fig. 8, a view similar to Fig. 1 with brackets on the oil pan, supporting a valve in the head motor.

Fig. 9, a view particularly in section on the line 9—9 of Fig. 8.

Fig. 10, a side view of a portion of the stand with parts in section showing a modified form of mechanism for elevating the oil pan.

Fig. 11, a view looking at the left end of Fig. 10.

Fig. 12, a sectional view on the line 12—12 of Fig. 10, and

Fig. 13, a fragmentary view showing the manner of mounting the motor on the oil pan for the purpose of running in or burnishing the bearings.

Referring to the drawings, the reference numerals 1 and 2 indicate a pair of spaced rails, preferably of channel iron, which form the base of the stand. At one end of these channel irons are connected by a bearing bracket 3 which extends upwardly therefrom, and has a bearing at the upper end in which one end of the shaft 4 is journaled, said shaft being supported adjacent its other end by the base 5 of a housing 6 which is formed with a bearing 7 in which the shaft 4 is journaled, said base 5 being likewise connected to the channel irons 1 and 2 so as to be held in proper alignment with the bearing of the bracket 3, and assist in holding the channel members 1 and 2 in the proper relative position. The shaft 4 projects through a detachable plate 8, at the opposite side of the housing 6 from the bearing 7, and has the projecting end provided with a key 9 to engage with a clutch member which slides on the end of the shaft 4 and serves to afford a driving connection with the crank shaft of a motor when the latter is positioned on the stand for burnishing the bearings. The housing 6 has a cap 11 secured on the upper end thereof with the shaft 10 journaled therebetween in parallel relation with the shaft 4, and this shaft has one end extending outside the housing adjacent the position in which the motor is mounted and provided with a key 12 to engage with a clutch member which slides onto the end of the shaft 10. The shafts 4 and 10 are provided in the housing with sprocket wheels 13 and 14 respectively for a chain belt 15 which affords a driving connection between the shafts, the sprocket 14 being preferably of larger diameter so as to operate the shaft 10 at a slower rate of speed than the shaft 4, this being desirable as the upper shaft 10 is used in the operation of burning in the bearings of a motor.

Loosely mounted on the shaft 4 between the bearing bracket 3 and the housing base 5 is the belt wheel 16 which co-operates with a clutch 17 which is keyed on the shaft 4 and operable by the lever 18 to establish and interrupt at will the driving connection of the belt wheel 16 with the shaft 4. I also prefer to have a hand wheel 19 keyed on the shaft 4 so that the latter as well as the shaft 10 may be manually turned to adjust the clutch members 67 and 75', hereinafter described, so as to connect with the companion clutch member on the crank shaft of the motor, or to permit manual adjustment of the crank shaft while a motor is being worked on and particularly for the purpose of trying out the fit of the crank shaft in the bearings as the work progresses.

At the opposite end of the channels 1 and 2 from the driving mechanism just described are a pair of spaced well casings 20, which have lateral web portions 21 connected with the members 1 and 2 to maintain the proper spaced relation thereof and hold the casings 20 upright, and a pan 22 which is preferably large enough to accommodate the largest size automobile engines, has a pair of correspondingly spaced sleeve supports 23 extending downwardly therefrom and fitting within the well casings 20. The lower end of each casing 20 is closed by a plate 24 having a central tubular standard 25 extending upwardly within the casing 20 and internally threaded to take a screw 26, the upper end of which is journaled in a plate 27 which is clamped between the bottom of the pan 22 and the upper end of the sleeve 23. A bevel gear 28 is keyed or otherwise secured on the reduced upper extremity of the screw shaft 26 so as to bear against the plate 27, and the reduced extremity of the screw shaft 26 may have a pin 29 therethrough at the opposite side of the plate 27 so as to hold the end of the shaft 26 engaged with the plate.

A shaft comprising two parts 30 having the ends coupled together by a sleeve 31 extends between and has the opposite ends journaled in the walls of the sleeves 23 adjacent the upper ends thereof, and there is a beveled gear 32 on each end of the shaft 30—30 within the respective sleeve 23 and meshing with the beveled gear 28 therein so that the said beveled gears and the screw shafts 26 with which they are connected are operated in unison. A shaft 33 extends laterally from one of the sleeves 23, being journaled in the wall of the sleeve and in a hanger 34 depending from the marginal flange 35 of the pan 22, and this shaft has a crank handle 36 on the outer end, and a beveled gear 37 on the inner end within the sleeve 23 and meshing with the beveled gear 28 on the screw shaft 26. In order that the beveled gear 37 will clear the beveled gear 32, the shaft 33 is disposed a little further than 90° from the shaft 30 as shown in Fig. 7.

From the foregoing it will be observed that operation of the shaft 33 by the crank 36 rotates the one beveled gear 28 and its screw shaft 26 and through the connection afforded by the beveled gears 32 and two part shaft 30—30, simultaneously and correspondingly rotates the other beveled gear 28 and its shaft so that the turning of said shaft in the tubular extensions 25 effects a corresponding raising or lowering movement of the two sleeves 23, and consequently both ends of the pan 22 so that the latter is maintained in a horizontal position as it is raised or lowered. In order to afford adjustment to level up the pan 22, the coupling 31 is provided between the two parts 30 of the shaft and has set screws 38 which enable one of the shaft parts 30 to be turned relatively to the other shaft so as to effect separate elevational adjustment of the opposite ends of the pan 22.

The well casings 20 are notched as indicated at 39 at their upper ends to admit the shaft 30—30 when the pan 22 is depressed to the lowermost position, and said casings are also split at their upper ends as indicated at 40 and have the opposed split portions connected by a threaded member 41 having a handle 42 so that the upper ends of the casings may be clamped tight against the sleeves 23 when the latter have been adjusted to bring the pan 22 to the desired elevation and thus lock the pan in the adjusted position.

In the operation of burning in the bearings of a motor, the latter has the lower half of the crank case removed and is inverted as indicated at 43. Motors which have valves at the side usually have the upper ends free of mechanism and the motor may therefore be seated directly on under supports, and the pan 22 has an adjustable rail at each side which are clamped on the lateral flanges 35 of the pan so that they may be adjusted to and from the center of the pan and form a rest for such a motor. These side rails which are indicated at 44 are preferably constructed as shown in Fig. 4 in the form of a wide plate of substantially the same length as the pan 22, and each rail is provided in its under side with a series of transversely extending T slots 52 to receive the heads of a series of bolts 45, which are passed through apertures in the lateral flanges 35 of the pan. Slots 46 extend longitudinally of the rails between the T slots 52 and at the outer side of the end slots 52, these slots being made wider at the under side of the plate, as indicated at 47, to receive the heads of bolts passing through the slots 46 or to receive the enlarged head 48 of a T shaped connector 49, which is used in connection with rods 50, in applying head clamps to a motor for holding the latter down upon the rails 44. These rails extend over end flanges 51 of the pan 22 and also engage the side flanges 35 so as to be held rigidly in horizontal position, even when adjusted well toward the center of the pan 22, and it will be observed that because of the engagement of the heads of the bolts 45 in the T shaped slots 52, the rails 44 have a wide range of lateral adjustment and furthermore, the provision of the rails with the longitudinal slots 46 affords ample longitudinal adjustment for making connections to clamp a motor on the stand.

When the motor is mounted in the inverted position the rails 44 are adjusted inwardly to a position substantially as shown in Fig. 3, so as to project sufficiently under the head of the motor, and T connectors 49 are inserted from the under side of the rails 44 through the slots 46, and have the angular ends of the rods 50 engaged in the apertures 53 thereof, said connectors 49 being adjusted to position a clamp 54 with which the upper ends are connected at a point where it will not interfere with operation of the crank shaft or access to the parts of the motor. This clamp 54 is preferably centrally arched and has the opposite ends formed with slots 55 through which the upper ends of the rods 50 are passed, and each rod has a hand wheel 56 or a nut threaded on the upper end so as to draw the clamp 54 down against the motor for clamping same in position on the rails 44.

Some of the motors are constructed with valves in the head and have overhead mechanism which renders it impossible or undesirable to support the motor as indicated in Figs. 1 to 3 inclusive. In order to adapt this machine for motors of that type, I provide a pair of standards 57, which are bolted onto the ends of the pan 22 as indicated in Figs. 8 and 9, and have the upper ends cut out centrally to accommodate the end bearings of a motor and afford upwardly extending portions at each side, formed with flanges 58 having transversely extending slots 59, in which bolts 60 are engaged for mounting angle irons 61 in spaced relation on the upper extremities of the standards 57. These angle irons by reason of the bolts 60 being engaged in the slots 59 are adjustable to secure the required spacing to receive the crank case of a motor therebetween with the crank case flanges resting on the horizontal flanges of these angle irons 61, and said horizontal flanges have a number of longitudinally extending slots 62, for bolts 63, which are engaged in bolt holes in the flanges of the motor crank case, thereby suspending the motor from the angle irons.

It is necessary in burning in the bearings with this motor stand to have the crank shaft of the motor in axial alignment with the shaft 10 of the motor stand, and the vertical adjustment for effecting such alignment is secured by first releasing the threaded members 41, and then operating the handle 36 to raise or lower the pan 22 as may be required to effect the alignment. The transverse adjustment of a motor to effect the shaft alignment is accomplished in the structure shown in Figs. 1 to 3 inclusive either by loosening the bolts 45 and adjusting the rails 44 transversely of the pan, or loosening the hand wheels 56 and adjusting the motor transversely on the rails 44 to the proper position, after which the hand wheels 56 are turned down on the rods 50 to apply the clamp 54 and hold the motor in place.

In the structure shown in Figs. 8 and 9 the lateral adjustment of the motor is accomplished by loosening the bolts 60 and moving the rails 61, on which the motor is carried, transversely, such adjustment being possible because of the slots 59 in which the bolts 60 engage. Thus, the motor in either case can be readily adjusted vertically and transversely so that the crank shaft is placed in perfect alignment with the shaft 10.

It is customary practice to provide motors with a plate 64 on the end of the crank shaft to which the fly wheel is bolted, the plate 64 being provided with a number of circumferentially arranged bolt holes for this purpose. I utilize this plate to make the connection between the crank shaft of the motor and the drive shaft 10. A disk 65, as shown in Fig. 6, has a stepped cavity in one side forming a number of seats of different diameters to receive crank shaft plates 64 of different diameters and this disk has radial slots 66 through which bolts which engage bolt holes of the plate 64 are passed for clamping the disk 65 onto the plate 64. In the construction shown, the plate 64 is of substantially the same diameter as the disk 65 and is clamped directly against the rim of the disk, but it is to be understood that plates 64 of smaller diameter will be engaged in the corresponding seat of the stepped cavity in the disk 65, and this construction renders it possible to readily center the disk 65 on the plate 64.

A clutch member 67 has a hub, which slides on the end of the shaft 10, and is provided with a key way engaging the key 12 so as to turn with the shaft, and this clutch member has a head 68 at the outer end with a central stud 69, which is adapted to engage a central aperture 70 in the disk 65, and also has a pair of axially extending pins 71 disposed at opposite sides of the stud 69 which are adapted to engage corresponding openings 72 in the disk 65. The clutch member 67 is slidable on the shaft to and from the clutch disk 65 on the crank shaft of the motor, when the latter is mounted on the stand, to establish or interrupt the driving connection, and this sliding connection is also useful in centering the crank shaft with the shaft 10 as the motor is merely adjusted, and the clutch connection tried out until the pins 71 and the center stud 69 engage easily without binding in the openings 70 and 72, in the clutch disk 65. The outer face of the clutch disk 65 is plain and the heads or nuts of the bolts 73, which connect the clutch disk with the crank shaft plate 64, of course extend beyond the outer surface of the clutch disk 65, and in order that the clutch head 68 may be moved up flush against the outer face of the clutch disk 65 without interference, the clutch head 68 is provided with a radial seat or recess 74 at each side of the center stud 69 which is sufficiently large to receive the heads of the bolts 73.

When the bearings of the motor have been properly burned in, it is desirable to operate the crank shaft with the bearings oiled so as to burnish the bearings by running them in oil.

To perform this operation, the motor is removed from the position shown in Figs. 1, 2 and 3 and Figs. 8 and 9 and reversed so that the crank shaft is directly above the pan 22, and this pan is then supplied with oil into which the ends of the cranks or the ends of the connecting rods dip so as to splash onto the various bearings. In mounting the motor in this position, the side rails 44 are adjusted outwardly substantially as shown in Fig. 13 so as to avoid interference with the crank portions of the rotating crank shaft, and preferably bringing the slots 46 at the inner edge of each side rail in alignment with the bolt holes of the side flanges of the motor crank case, and bolts are inserted up through the slots 46 and through the bolt holes of the side flanges of the crank case so as to clamp the motor onto the side rails. When so positioned, the pan 22 is almost completely enclosed except perhaps at the ends, and thus confines the oil so that it is not thrown outside the enclosure, when the crank shaft is rotated to burnish the bearings. The crank shaft of the motor is of course adjusted so as to align with the shaft 4 of the motor stand, which shaft, as hereinbefore indicated, rotates at a higher rate of speed than the shaft 10, such adjustment being effected by operating the crank 36 to raise or lower the pan 22 and motor, and by adjusting the rails 44 laterally on the pan 22. A clutch 75' similar to the clutch 67 is mounted on the shaft 4 so as to rotate therewith and has a center stud and pins at the opposite sides of the center stud similar to those of the clutch 67, which engage with the apertures 70 and 72 of the shaft 4.

In making the clutch connection, it is frequently necessary to turn the shafts 4 or 10 to some extent so as to bring the pins 71 in position to register with the openings 72, and with the hand wheel 19 on the shaft 4 this operation of the shafts may be readily effected. The hand wheel 19 is also useful in the operation of burning in the bearings and running them in, to test the progress of the work, as the ease with which the wheel 19 is turned determines whether the bearings are too tight or too loose and further operation or adjustment may then be made to secure the proper working of the bearings.

The modified structure shown in Figs. 10, 11 and 12 has reference to the mechanism for elevating the pan 22, in this modified form each of the sleeves 23 being formed with a rack 75, which works in a vertical groove in the well casing 20, and the rack on each sleeve is engaged by a pinion 76, said pinion being fixed on aligning shaft sections 77, which at opposite sides of the pinion 76 are journaled in bearings 78, on the upper extremities of the well casing 20. The adjacent ends of the shaft section 77 are connected similarly to the shaft sections of the structure previously described by a coupling 79, which has set screws 80 to clamp the ends of the shaft sections 77 in the coupling.

The end of one of the shaft sections 77 is extended beyond the bearings 78 and is provided with a worm wheel 81 which is engaged by a worm 82 on the shaft 83, the latter being mounted in elevated bearings 84 which are connected by a cross plate 85, said cross plate being secured on the channel irons 1 and 2. A crank handle or wheel 86 is fixed on the outer end of the shaft 83 and serves through the worm 82 and worm wheel 81 to operate the pinions 76 in unison for raising or lowering the pan 22, and the worm and worm wheel connection serves to automatically lock the parts in any position to which they are adjusted. The coupling 79 serves as in the previously described construction, to permit relative adjustment of the shaft sections 77 and their pinions for the purpose of leveling up the pan 22.

In using this device the bottom one half of the motor crank case is first removed, and if the motor is of the ordinary side valve type, it is placed in the inverted position on the side rails 44 with the crank shaft plate 64 adjacent the clutch member 67 on the shaft 10, and the arched clamps 54 are placed over the top of the open crank case at points where they will not interfere with the mechanic in working on the bearings, and these clamps are secured in place by inserting the T connectors 49 in the slots 46 of the side rails directly under the outer ends of the clamps 54, and connecting the connectors and clamps by the rods 50. If the motor is of the valve-in-the-head type, it cannot be placed on the side rails 44 without removing the valve mechanism which is unnecessary and undesirable, and I, therefore, to accommodate such motors, mount the standards 57 at opposite ends of the pan 22 with the angle iron rails 61 thereon and suspend the motor from these angle iron side rails. The motor is elevated by turning the crank 36 or the crank wheel 86, as the case may be, and raising the motor until the crank shaft is apparently in horizontal alignment with the shaft 10 and the motor is also shifted laterally on the rails 44 until the crank shaft appears to be vertically aligned with the shaft 10. Assuming that the clutch disk 65 has been properly connected with the fly wheel plate 64, the clutch 67 is turned by manipulating the hand wheel 19 until the pins 71 are directly in front of the openings 72 in the disk, and the clutch member 67 is moved axially on the shaft 10 to try the fit of the pins 71 in the openings 72. If they do not enter the holes easily but appear to bind, the motor is adjusted in the required direction to correct the misfit, and the trying of the clutch and adjustment of the motor is repeated, if necessary until the pins 71 enter the openings 72 easily in any position in which the clutch member 67 is turned, and this insures proper alignment with the crank shaft 10.

This position of the motor renders it convenient to work on the bearings so that they can be re-made or re-babbitted or tightened by removing the necessary shims, after which, the drive wheel 16 which is connected to a suitable source of power is connected by the clutch 18 to the shaft 4 so as to drive the shaft 10, and as the latter is connected through a clutch member 67 with the crank shaft the latter will be rotated so that the bearings will become heated and the metal worked into a smooth fit around the bearing portion of the shaft. After the burning in of the bearings is accomplished to a sufficient extent, which may be determined by manipulating the hand wheel 19, the position of the motor is reversed so that the crank case flanges rest upon the side rails 44 and the crank portions dip down into the pan 22, which is then almost completely closed by the upper portion of the crank case. The motor is also adjusted so that the crank shaft is brought into alignment with the lower shaft 4 and clutched to this shaft, after which the shaft 4 is operated thereby rotating the crank shaft at a comparatively high rate of speed, and oil being placed in the pan 22 to a suitable level so that the ends of the crank members dip therein, the oil will be splashed around onto the bearings and the latter lubricated so that the bearings will be smoothed up or oil burnished.

It will be observed from the foregoing that the machine is adapted to readily accommodate all sizes and types of motors, which it is customary to use in automobile construction; that the stand is quickly and easily adapted for the different sizes or types; that the motor is easily clamped in place in such a manner that the clamping members do not interfere with desired access to the parts of the motor to be repaired; that the motor is conveniently adjustable to align with the particular shaft by which it is to be operated, and that the particular clutch connection, which I have provided, affords a convenient driving connection which is adaptable to all types of motors and enables the alignment of the crank shaft with the drive shaft to be readily effected.

While I have shown and described my invention in a preferred form, I am aware that various changes and modifications may be made without departing from the principles of my invention, the scope of which is to be determined by the appended claims.

I claim as my invention:

1. In a device of the class described, the combination of a frame having a pan mounted thereon for supporting a motor, a pair of laterally separable members mounted respectively on the opposite sides of the pan, clamps for securing the motor on said members, and driving mechanism on the frame including coupling means at one end of the pan adapted to be connected with the crank shaft of a motor mounted on said members.

2. In a device of the class described, the combination of a frame, a pair of elongated laterally spaced motor supports mounted on the frame, means whereby said supports are individually adjustable to and from one another, elevating mechanism for simultaneously raising and lowering the supports, and driving mechanism on the frame including a coupling adjacent one end of the supports for detachably connecting the driving mechanism with the crank shaft of a motor on the supports.

3. In a device of the class described, the combination of a frame, a pan mounted on the frame, elevating mechanism for vertically adjusting the pan, a support at each side of the pan, means whereby each support is individually adjustable to and from the other support, clamps for securing a motor on the supports, and driving mechanism on the frame including a coupling for detachably connecting the driving mechanism with a crank shaft of a motor on said supports.

4. In a device of the class described, the combination of a frame, an elongated pan mounted on the frame, an elongated plate at each side of the pan having transverse and longitudinal slots, means engaging the transverse slots for connecting the plates with the pan so that the plates are adjustable to and from one another, clamps engaging the longitudinal slots and adjustable lengthwise of the plates for clamping a motor onto the latter, and driving mechanism on the frame including a coupling for detachably connecting the driving mechanism with the crank shaft of a motor clamped on said plates.

5. In a device of the class described, the combination of a frame, a pair of laterally spaced elongated supports mounted on the frame and adapted for independent adjustment to and from one another, elevating mechanism operable to simultaneously raise and lower the supports, a pan extending between and vertically adjustable with the supports, means for clamping a motor on the supports and driving mechanism including a coupling for adjustably connecting the driving mechanism with the crank shaft of a motor mounted on the supports.

6. In a motor stand, the combination of a frame, an elongated motor support on the frame, a pair of spaced elevating devices operable to raise and lower the support, connections for operating the elevating devices in unison, members on the support and adjustable transversely thereof whereby the support is adaptable to different types of motors, and driving mechanism on the frame including a coupling for adjustably connecting the driving mechanism with the crank shaft of a motor on the support.

7. In a motor stand, the combination of a base having a pair of superposed shafts journaled therein in parallel relation, a motor support beyond the ends of the shafts and adjustable vertically on the base, means on the support for clamping a motor on the support in reversed positions so that the crank shaft is optionally positioned adjacent either of the first-mentioned shafts, said means being adapted to permit adjustment of the motor transversely of the support, and detachable couplings for connecting the crank shaft of the motor with either of the first-mentioned shafts.

8. In a motor stand, the combination of a base having a shaft journaled thereon, a motor support adjacent the end of the shaft, a motor supporting rail at each side of the support, and adjustable transversely thereof, and clamping members adjustable lengthwise of the rails for clamping the motor on the rails.

9. In a motor stand, the combination of a base having a shaft journaled thereon, a pan adjacent and extending longitudinally beyond the end of the shaft, and means for clamping the upper half of a motor crank case on the said pan, said means comprising adjustable members interposed between the pan and crank case, and permitting adjustment of the motor transversely of the support.

10. In a motor stand, the combination of a base having a pair of shafts journaled thereon in parallel vertically spaced relation, a motor support at one end of the shafts having means for adjustably connecting the upper half of a motor crank case thereto, and a detachable standard at each end of the support having a pair of parallel rails extending therebetween, and adapted to be adjustably connected with the crank case for supporting the motor in an inverted position, and means for connecting the crank shaft of the motor in each position to a corresponding shaft on the motor stand.

11. In a motor stand, the combination of a base having a shaft journaled thereon, a motor support adjacent the end of the shaft, and a pair of separable clutch members independently attached respectively to the fly wheel plate of the motor crank shaft and the first-mentioned shaft.

12. Means for detachably connecting the crank shaft of a motor with an aligning drive shaft which comprises a clutch member slidable on the drive shaft, and a companion clutch member independently clamped on a fly wheel plate on the crank shaft.

GEORGE F. WERTH.